United States Patent [19]

Klingler

[11] Patent Number: 4,752,181
[45] Date of Patent: Jun. 21, 1988

[54] METHOD AND ARRANGEMENT FOR THE AUTOMATIC TRANSFER AND CLAMPING OF WORKPIECES

[75] Inventor: Otto Klingler, Oberndorf-Boll, Fed. Rep. of Germany

[73] Assignee: Mauser-Werke Oberndorf GmbH, Oberndorf, Fed. Rep. of Germany

[21] Appl. No.: 734,400

[22] Filed: May 15, 1985

[30] Foreign Application Priority Data

Jun. 7, 1984 [DE] Fed. Rep. of Germany ....... 3421169

[51] Int. Cl.⁴ .............................................. B65G 00/00
[52] U.S. Cl. .................... 414/752; 414/786; 294/64.1
[58] Field of Search ............ 414/752, 737, 744 B, 414/225, 786; 901/6, 8, 40; 279/3; 294/64.1

[56] References Cited

U.S. PATENT DOCUMENTS 2,948,337 8/1960 Wolter ................................ 414/737
4,002,246 1/1977 Brandt et al. ...................... 414/744

FOREIGN PATENT DOCUMENTS 0082708 7/1981 Japan ................................. 414/270

Primary Examiner—Robert J. Spar
Assistant Examiner—D. Glenn Dayoan
Attorney, Agent, or Firm—Scully, Scott, Murphy & Presser

[57] ABSTRACT

A method for the automatic, correctly positioned transfer and clamping of workpieces, especially rotationally-symmetrical, thin-walled workpieces, which are imparted on interdependent finishing or processing on both sides thereof in a machining work station, in which the workpiece is retained through the intermediary of vacuum-operated clamping units, and which are maintained in a transferring and receiving work station through main spindles coaxially facing towards each other. Furthermore, also provided is an arrangement for implementing the above-mentioned inventive method for the automatic, correctly positioned transfer and clamping of workpieces, especially, rotationally-symmetrical, thin-walled workpieces.

13 Claims, 1 Drawing Sheet

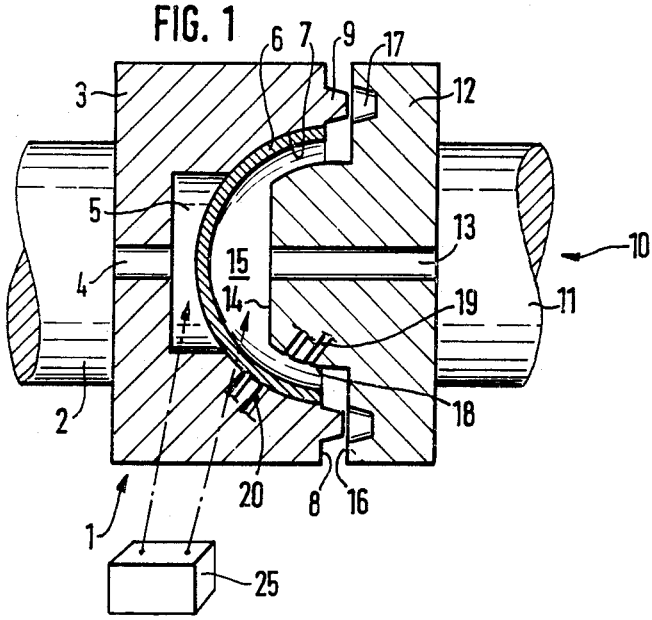
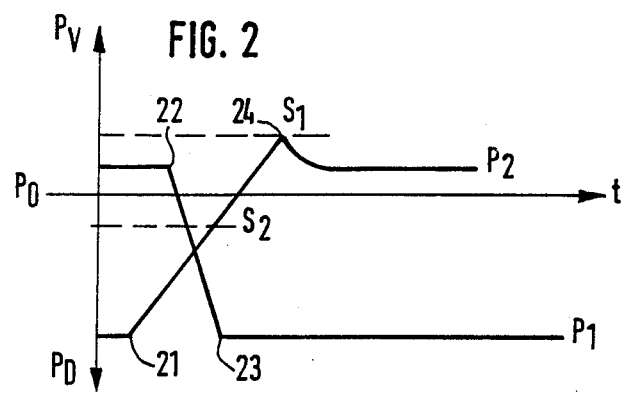

METHOD AND ARRANGEMENT FOR THE AUTOMATIC TRANSFER AND CLAMPING OF WORKPIECES

BACKGROUND OF THE INVENTION

1. Field of the Invention

The present invention relates to a method for the automatic, correctly positioned transfer and clamping of workpieces, especially rotationally-symmetrical, thin-walled workpieces, which are imparted on interdependent finishing or processing on both sides thereof in a machining work station, in which the workpiece is retained through the intermediary of vacuum-operated clamping units, and which are maintained in a transferring and receiving work station through main spindles coaxially facing towards each other. Furthermore, the invention relates to an arrangement for implementing the above-mentioned inventive method for the automatic, correctly positioned transfer and clamping of workpieces, especially, rotationally-symmetrical, thin-walled workpieces.

The implementing of the automatic finishing or machining on both sides of especially thin-walled, rotationally-symmetrical parts requires an automatic handling of such parts which will ensure the correctly positioned transfer of the parts from one work station to a subsequent work station. The importance of the precision of the transfer of the parts substantially precludes the utilization of handling or manipulating apparatuses. The parts, in effect, the workpieces, must be transferred directly from one work station having a main spindle and a clamping collet, to another work station, in order to eliminate the sources of error caused by handling apparatuses which are arranged between the workpieces. The utilization of vacuum-operating clamping devices is a prerequisite to the finishing and profiling of both sides of the workpieces.

2. Discussion of the Prior Art

A method for the clamping of workpieces, as well as an arrangement for implementing this method with the aid of vacuum-operated clamping units, is known, for example, from the disclosure of German Laid-Open Patent Application No. 31 26 720. Pursuant to this method, an air cushion is generated at discretely located support points on the workpiece with the aid of the clamping units, on which a workpiece can be floatingly slid into the applicable work position, so as to be finally clamped fast through the application of a vacuum. This method and the respective arrangement can, however, only be employed when the workpieces essentially are large-sized and flat, have a thin wall thickness, and are positioned on a plurality of support points. A correctly positioned transfer of the workpieces cannot be attained with this arrangement.

SUMMARY OF THE INVENTION

Accordingly, it is an object of the present invention to provide a method and an arrangement of the above-mentioned type in which the clamping arrangements which are to receive or pickup the workpiece, lie closely against the workpiece which is to be received at a definite force. Hereby, there must naturally be avoided any condition during which the workpiece can change its spatial orientation in the absence of a restraining force.

Basically, the foregoing inventive object is achieved by effectuating the following method steps:

a first of two work stations carries a work piece at a first, pregiven speed, by means of a linear drive system such as a hydraulically actuatable spindle sleeve or carriage, toward a second work station, until the two work stations are spaced apart a cartain distance relative to each other;

the drive system changes over to slow motion, starting from that selected position, for a final linear movement of the first work station;

the transferring work station develops a pressurized air ring ahead of this work station, which upon the reaching of a certain distance from the workpiece which is to be received, is continually switched over into a vacuum;

the transferring work station generates a vacuum for the correctly positioned restraint of the workpiece in the clamping device, and this vacuum is ended only when the receiving work station has already been switched to vacuum over a portion of its movement;

the transferring work station develops a pressurized air ring ahead of the work station, before the present vacuum in the receiving work station has reached its rated value;

the linear drive system reverses the movement of the receiving work station, together with the vacuum-clamped workpiece, away from the transferring work station and into a work position;

a pressure monitoring system in the work stations controls and actuates the pregiven pressure relationships in the clamping units at predetermined points in time.

In one embodiment of the inventive method, the receiving work station can be prepositioned up to about 3 mm in front of a completed closed fit, and this station develops an air ring, by means of air nozzles in the edge zone of its clamping unit. The pressure of the air ring is reduced and then switched over into a vacuum, as the workpiece approaches the completely closed fit. Concurrently with the buildup of the vacuum in the receiving work station, the workpiece is vented in a throttled or controlled manner from the transferring work station. The pressure in the system can be measured, and at the pregiven switching value, changed from pressure to vacuum.

In this embodiment, only one of the two work stations possesses a linear drive system which will cause movement of the workpiece, with a predeterminable force which can correspond to the differential pressure in a hydraulic cylinder, and the introduction thereof into the receiving work station. Hereby, the transporting movement is effected in a rapid motion which is switched into a slow motion commencing from a certain preliminary position. The entire system is controlled by effecting a pressure monitoring of the devices. In effect, there is carried out a measuring of the pressure in the drive system and a comparison effected with a pregiven switching value which then reverses the clamping pressure into a vacuum. Only thereafter is there effected the return movement of the linearly displaced processing unit. After reaching the mentioned preliminary position at a spacing of about 3 mm between the transferring and the receiving work stations, then through an alternating development of a pressurized air ring and of a vacuum, the workpiece is then transferred and subsequently clamped.

The inventive arrangement for implementing the above-mentioned method comprises first and second work stations, each of which includes a clamping unit. The clamping unit of one work station is constructed as a mandrel with a flattened head and an air inlet passageways, and the clamping unit of the second work station is cup-shaped and includes air inlet passageways. Both clamping units can be centered in an outer ring through a trunnion-bore connection. Hereby, the trunnion can be a conically-shaped projection, and fit into a complementary shaped bore on the outer ring of the clamping unit. Furthermore, air inlet passageways can be located centrally, as well as peripherally, in the clamping unit.

The linear drive system, pursuant to a further modification of the inventive arrangement, can be a hydraulically actuatable spindle sleeve; however it can also be a hydraulically actuated carriage.

BRIEF DESCRIPTION OF THE DRAWINGS

Reference may now be had to the following detailed description of an exemplary embodiment of the invention, taken in conjunction with the accompanying drawings; in which;

FIG. 1 illustrates a partial cross sectional view through a pair of work stations during the transferring of a workpiece; and FIG. 2 is a graph showing pressure changes in the work stations.

DETAILED DESCRIPTION

The first work station 1 includes a main spindle 2 which has a clamping device 3 fastened thereon. Hereby, the clamping device 3 is cup-shaped and is equipped with a central air inlet passageway 4. This inlet passageway 4 connects with a central internal recess of essentially circular configuration. Extending from this recess 5 is the wall of the clamping device 3, which is shaped in conformance with the external contour of the workpiece 6 which is to be received thereon. Inasmuch as the example pursuant to FIG. 1 relates to a workpiece having a hemispherical configuration, the inner edge region 7 of the clamping device 3 is also spherically configured. On the outer ring 8 at the end surface, the clamping device includes conical trunnions or protrusions 9, which are uniformally distributed about the circumference.

The second work station 10 is similarly equipped with a main spindle 11 and a clamping device 12. Hereby, the main spindles 2 and 11 of the work stations 1 and 10 are located opposite each other along a single axis.

In this instance, the clamping device 12 is formed as a mandrel and is provided with a central air inlet passageway 13. The mandrel is spherically-shaped at its head end in a suitable conforming contact with the inner configuration of the workpiece which is to be received, and is flattened at its forward end surface 14. Consequently, between the flattening and the inner region of the spherical workpiece, there is produced a hollow space 15. On the outer ring 16 on the end surface, the clamping device 12 includes conical recesses 17 which are distributed about the circumference thereof, into which the trunnions or protrusions 9 of the clamping device 3 move upon the closing movement of the two work stations. Arranged in the spherical outer region 18 of the mandrel-shaped clamping device 12, as well as in the spherical outer region 7 of the clamping device 3, are respectively further air outlet openings 19 and 20, which can be connected with the respective main passageways 4 and 13.

The method for the transfer and the fixed clamping of the essentially rotationally-symmetrical thin-walled workpieces which are to be finished or machine on both sides thereof, is carried out pursuant to the following method steps:

The workpiece 6 is initially located in the clamping device 3 of the work station 1 and is retained therein by means of a vacuum. After the internal finishing of the workpiece 6 is completed, it is transferred to the work station 10. For this purpose, the clamping device 12 of the work station 10 moved by a linear drive system (not shown) up to a definite distance from the clamping device 3. Hereby, the protrusions 9 at the end surface of the clamping device 3 already slightly enter into the recesses 17 of the clamping device 12, centering the two clamping devices with respect to each other. Further movement of the clamping device 12 in a direction towards the workpiece is done at a lower rate. Hereby, due to the openings 19 in the spherical area of the mandrel 12 a pressurized air ring is developed between the clamping device and the workpiece 6.

This will prevent any damage of the workpiece caused by any excessively rapid and possibly incorrect entering movement of the clamping devices. Upon the continued entering movement of the clamping device 12, the air pressure is gradually reduced until into a vacuum is develop. This can be ascertained in FIG. 2 at point 21. At a different point in time, the vacuum in the clamping device 3 is ended and is switched over into a positive air pressure. This switching point in time is shown in FIG. 2 at point 22. The buildup of a pressurized air ring in the clamping device 3 produces a throttled or restricted moving of the workpiece 6. Concurrently, the increasing vacuum in the clamping device 12, completes the receiving sequence and the concurrent fixed clamping of the workpiece 6 in the clamping device 12. As is again illustrated in FIG. 2, the pressurized air ring in the clamping device 3 has already been produced at point 23 before the vacuum at point 24 has reached its highest level in the clamping device 12. The use of this method and the inventive arrangement avoids a condition during which the workpiece 6 can change its spatial orientation without any restraining force. This signifies that in a simple type and manner there is carried out a correctly positioned transfer of a thin-walled rotationally-symmetrical workpiece. Air nozzles are arranged in the critical edge zones of the spherical configuration of the clamping devices 3 and 12, in order to herein attain a precise transfer of the workpiece, as well as avoiding any damage to the workpiece or to the clamping devices. The inlet conduits for the compressed air, as well as for producing the vacuum, are identical. The rapid movement of the work station, which is carried out up to a free prepositioning prior to the completely closed fit of the work stations, allows for an initiation of the workpiece transfer within a relatively short period. When the vacuum in the first work station 1 is deactivated, there is effected the switching over to the generation of an air pressure which will exit through the air nozzles in the spherical edge zone 7. Only when the workpiece has contacted the mandrel-shaped clamping device 12, will the workpiece then be completely transferred in a throttled manner from the clamping device. In the same sense is there then effected the throttled buildup of the vacuum in the clamping device 12.

A pressure monitoring system 25 in the work stations can be used to control the transfer and the clamping of the workpieces 6.

The vertical axis 26 in the graph in FIG. 2 represents the air pressure in the clamping devices 3 and 12, and the horizontal axis in this graph represents time. Instead of time, the horizontal axis of the graph of FIG. 2 could also represent the extent of movement of the clamping devices 3 and 12 during the transfer of a workpiece 6.

What is claimed is:

1. A method for transferring a workpiece between first and second work stations, comprising the steps of:
   holding the workpiece on the first work station by maintaining the air pressure rearward of the workpiece less than the air pressure forward thereof;
   moving the work stations from an open position, wherein the work stations are spaced apart, to a closed position, wherein the work stations are in contact with each other, the moving step including the steps of
   (i) moving one of the first and second work stations toward the other one of the first and second work stations at a first pre-set rate until the work stations are a pre-set distance apart, and
   (ii) further moving said one work station towards said other work station at a second pre-set rate, slower than the first pre-set rate, after the work stations reach said pre-set distance;
   after the work stations reach said pre-set distance, decreasing the air pressure forward of the workpiece, and increasing the air pressure rearward of the workpiece to a level greater than the air pressure forward thereof to move the workpiece from the first work station to the second work station; and
   holding the workpiece on the second work station by maintaining the air pressure forward of the workpiece less than air pressure rearward thereof;
   wherein the step of decreasing the air pressure forward of the workpiece includes the step of decreasing the air pressure forward of the workpiece at a first predetermined time; the step of increasing the air pressure rearward of the workpiece includes the steps of (i) increasing the air pressure rearward of the workpiece at a second predetermined time, (ii) increasing the air pressure rearward of the workpiece to a first high pressure level at a third predetermined time, and (iii) then maintaining the air pressure rearward of the workpiece at the high pressure level; the step of decreasing the air pressure forward of the workpiece further includes the step of decreasing the air pressure forward of the workpiece to a first low pressure level at a fourth predetermined time; the first predetermined time is prior to the second predetermined time; and the third predetermined time is before the fourth predetermined time;
   further including the steps of increasing the air pressure forward of the workpiece after the fourth predetermined time to a second low pressure level, greater than the first low pressure level; and then maintaining the air pressure forward of the workpiece at the second low pressure level;
   wherein the first work station includes a first annular surface projecting around the workpiece, and a plurality of trunnions circumferentially spaced around and extending outward from the first annular surface; the second work station includes a second annular surface projecting around the workpiece, and a plurality of bores circumferentially spaced around and extending inward from the second annular surface; and
   wherein the further moving step includes the step of moving the trunnions into the bores to align the work stations as said work stations move into the closed position.

2. A method for transferring a workpiece between first and second work stations, comprising the steps of:
   holding the workpiece on the first work station by maintaining the air pressure rearward of the workpiece less than the air pressure forward thereof;
   moving one of the first and second work stations toward the other one of the first and second work stations at a first pre-set rate until the work stations are a pre-set distance apart;
   further moving said one work station towards said other work station at a second pre-set rate, slower than the first pre-set rate, after the work stations reach said pre-set distance;
   after the work stations reach said pre-set distance, decreasing the air pressure forward of the workpiece, and increasing the air pressure rearward of the workpiece to a level greater than the air pressure forward thereof to move the workpiece from the first work station to the second work station; and
   holding the workpiece on the second work station by maintaining the air pressure forward of the workpiece less than the air pressure rearward thereof;
   wherein the second work station includes a peripheral portion having a plurality of air nozzles; and
   the step of decreasing the air pressure forward of the work piece includes the steps of
   (i) conducting air outward through the air nozzles,
   (ii) then reducing the pressure of the air conducted outward through the air nozzles, and
   (iii) then drawing air inward through the air nozzles.

3. A method according to claim 2, wherein:
   the moving step includes the step of linearly moving the one work station toward the other work station along an axis; and
   the further moving step includes the step of further linearly moving the one work station toward the other work station along the axis.

4. A method according to claim 3, wherein: in the closed position, the work stations engage each other and form a closed unit; and
   the work stations are spaced apart about 3 mm from the closed position when the work stations are said preset distance apart.

5. A method according to claim 2, wherein:
   the step of decreasing the air pressure forward of the workpiece includes the step of decreasing the air pressure forward of the workpiece at a first predetermined time; and
   the step of increasing the air pressure rearward of the workpiece includes the step of increasing the air pressure rearward of the workpiece at a second predetermined time; and
   the first predetermined time is prior to the second predetermined time.

6. A method according to claim 4, wherein:
   the step of increasing the air pressure rearward of the workpiece includes the steps of (i) increasing the air pressure rearward of the workpiece to a first high pressure level at a third predetermined time, and (ii) then maintaining the air pressure rearward of the workpiece at the high pressure level;

the step of decreasing the air pressure forward the workpiece includes the step of decreasing the air pressure forward of the workpiece to a first low pressure level at a fourth predetermined time; and the third predetermined time is before the fourth predetermined time.

7. A method according to claim 6, further including the steps of:

increasing the air pressure forward of the workpiece after the fourth predetermined time to a second low pressure level, greater than the first low pressure level; and then maintaining the air pressure forward of the workpiece at the second low pressure level.

8. A method for transferring a workpiece between first and second work stations, comprising the steps of:

holding the workpiece on the first work station by maintaining the air pressure rearward of the workpiece less than the air pressure forward thereof;

moving one of the first and second work stations toward the other one of the first and second work stations at a first pre-set rate until the work stations are a pre-set distance apart;

further moving said one work station towards said other work station at a second pre-set rate, slower than the first pre-set rate, after the work stations reach said pre-set distance;

after the work stations reach said pre-set distance, decreasing the air pressure forward of the workpiece, and increasing the air pressure rearward of the workpiece to a level greater than the air pressure forward thereof to move the workpiece from the first work station to the second work station; and holding the workpiece on the second work station by maintaining the air pressure forward of the workpiece less than the air pressure rearward thereof;

wherein the step of decreasing the air pressure forward of the workpiece includes the step of decreasing the air pressure forward of the workpiece when the first and second work stations are a first predetermined distance apart; and the step of increasing the air pressure rearward of the workpiece includes the step of increasing the air pressure rearward of the workpiece when the first and second work stations are a second predetermined distance apart, said second predetermined being less than the first predetermined distance.

9. Apparatus for handling and transferring a workpiece, comprising:

a first work station adapted to hold the workpiece;

a second station also adapted to hold the workpiece;

means supporting the work station for relative movement toward and away from each other between an open position, wherein the work stations are spaced apart, and a closed position, wherein the work stations are in contact with each other;

control means connected to the first and second work stations to decrease the air pressure forward of the workpiece when the first and second work stations are a first predetermined distance apart, and to increase the air pressure rearward of the workpiece when the first and second work stations are a second predetermined distance apart, less than the first predetermined distance;

the first work station including (i) an axially extending spindle, (ii) means defining a recess located rearward of the workpiece, (iii) means to conduct air into and to draw air from the recess to vary the air pressure rearward of the workpiece selectively to hold the workpiece on the first work station and to help transfer the workpiece between the work station, and (iv) an annular surface projecting around the recess; the second work station including (i) a spindle coaxial with the spindle of the first work station, (ii) a mandrel including a back surface adapted to fit into the workpiece, (iii) means to conduct air through the mandrel and through the back surface thereof to vary the air pressure forward of the workpiece selectively to hold the workpiece on the second work station and to help transfer the workpiece between the work stations, and (iv) an annular surface projecting around the mandrel; one of the first and second work stations further including a plurality of trunnions circumferentially spaced around and extending outward from the annular surface of said one work station, the other of the first and second work stations including a plurality of bores circumferentially spaced around and extending inward from the annular surface of the other of the first and second work stations, said bores being axially aligned with said trunnions to receive the trunnions and guide the work stations into the closed position as the work stations move into contact with each other.

10. Apparatus according to claim 9, wherein: each of the trunnions has a conical shape; and each of the bores has a conical shape.

11. Apparatus according to claim 9, wherein:

the first work station defines a central axis, and further includes (i) an engagement surface extending between the recess and the annular surface of the first work station, and adapted to engage the workpiece, (ii) a central air passageway, coaxial with the central axis of the first work station, and in fluid communication with the recess, and (iii) a first group of outer air passageways, spaced from the central axis of the first work station, and extending through the engagement surface thereof;

the second work station defines a central axis, and further includes (i) an engagement surface extending between the back surface of the mandrel and the annular surface of the second work station, and adapted to engage the workpiece, (ii) a central air passageway, coaxial with the central axis of the second work station, and extending through the back surface of the mandrel, and (iii) a second group of outer air passageways, spaced from the central axis of the second work station, and extending through the engagement surface thereof.

12. Apparatus according to claim 9, wherein the means supporting the work stations for relative movement includes a hydraulically operated spindle sleeve connected to one of the first and second work stations.

13. Apparatus according to claim 9, wherein means supporting the work stations includes a hydraulically-actuatable carriage connected to one of the first and second work station.

* * * * *